July 20, 1937. S. J. SCHIAVON 2,087,553
WHEEL BRAKE
Filed Sept. 10, 1936
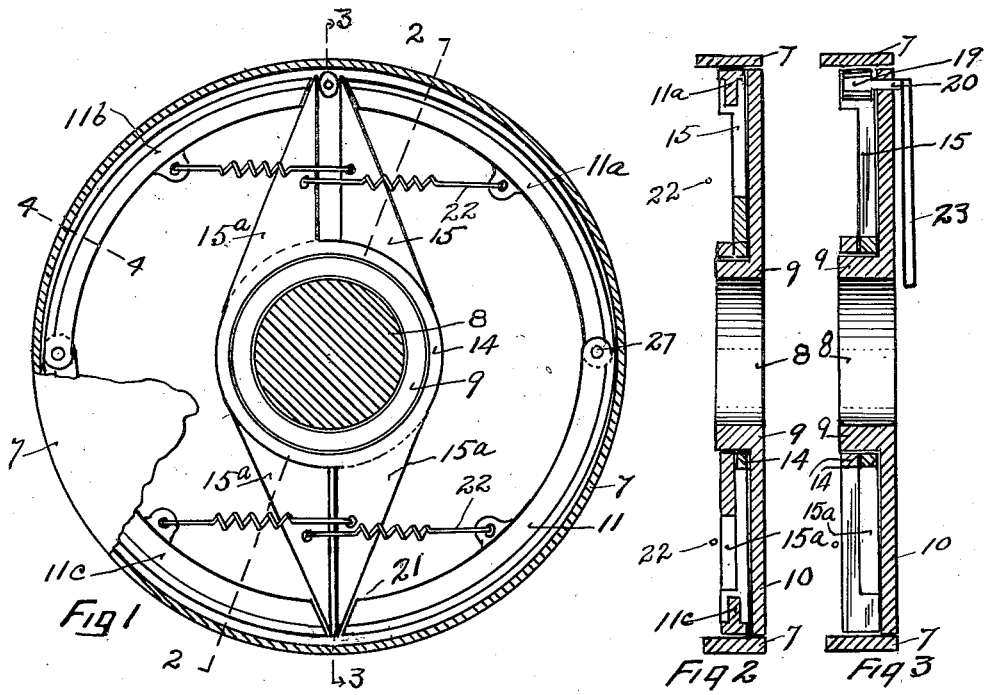
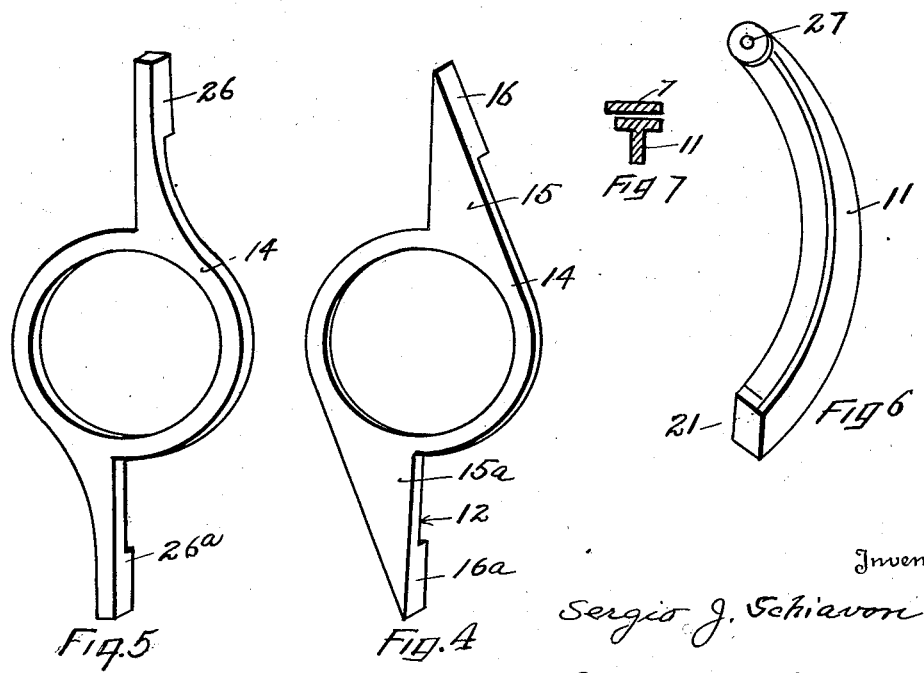
Inventor
Sergio J. Schiavon
By Francis C. Huebner
Attorney Patented July 20, 1937

2,087,553

UNITED STATES PATENT OFFICE 2,087,553

WHEEL BRAKE

Sergio J. Schiavon, Fresno, Calif.

Application September 10, 1936, Serial No. 100,075

1 Claim. (Cl. 188—78)

My invention relates to a wheel brake, and more specifically to an internal brake for use on an automobile or truck. It can be used on any form of wheel.

The usual form of internal brake comprises a rotatable drum attached to the wheel and rotatable therewith, and there is one pair of brake shoes pivotally anchored at one end. By pressure applied at the free ends of the shoes said shoes are pressed against the periphery of the drum. The objection to this form which I desire to overcome is that the brake shoes are of such comparative length with the periphery of the drum that only a small surface of the brake shoe engages the drum. More braking surface is available if there are four shoes comprising the circle than if only two are used. The object of my invention is to form an internal brake in which there are a plurality of brake shoes and in which the maximum surface of the brake shoe will engage the drum.

Another object is a device for automatically actuating simultaneously a plurality of shoes so that the pressure of each shoe against the drum will be uniform with the pressure of the other shoes.

Other objects will be hereinafter disclosed.

These objects are accomplished by means of the device herein described and illustrated on the accompanying drawing in which Fig. 1 is a front view of the assembled brake, having a large portion of the drum cut away to disclose the brake shoes and cooperating parts.

Fig. 2 is a sectional view of the device along sectional line 2—2 in Fig. 1.

Fig. 3 is a sectional view of the device along sectional line 3—3 in Fig. 1.

Fig. 4 is one of a pair of spreaders shown assembled in Fig. 1.

Fig. 5 is a modified form of spreader unit shown in Fig. 4.

Fig. 6 is a single shoe as shown assembled in Fig. 1.

Fig. 7 is a sectional view of a shoe and portion of the drum along the sectional line 4—4 in Fig. 1.

Referring to the drawing, a brake drum 7 is attached to the wheel (not shown) said wheel and drum being attached to shaft 8 which is rotatable within a housing 9. A circular plate 10 is rigidly attached to the housing concentric with the brake drum and immediately adjacent thereto. The object of plate 10 is an anchorage and base for the brake shoes hereinafter described. Each of these brake shoes are shaped as an arc of a circle, the outer curve conforming to the inside periphery of the drum. These shoes are pivotally anchored to the circular plate in pairs, that is, the adjacent ends of the shoes forming a pair are pivoted with a common pivot to said base, said pivotal connections being near the periphery of the circular plate so that with a slight movement of the brake shoe when assembled with the drum, the surface of the outside curve of the shoe will engage the drum. The shoes are of such length that when assembled the free ends of adjacent shoes will be spaced apart. It will be noted that to operate this brake pressure must be placed on the free end of each shoe to press it against the inside periphery of the drum. This is accomplished by the following novel device.

I have provided a pair of spreaders, each pair consisting of two members 12, shown in Fig. 4. This member comprises a ring 14 which is adapted to be rotated to a limited degree on the housing 9, or on a bearing which is positioned concentric with housing 9, and as an extension thereof. This ring has tangential arms 15 and 15a. These arms terminate in enlarged surfaces 16 and 16a, such enlargements being on the same face of the member. The spreader is arranged so the two members are concentric, and the sloping faces of each member when assembled with the base and brake shoes are adjacent to the free ends of said brake shoes. In the drawing I have shown four brake shoes and four of the tangential arms. It is noted that if said brake is constructed with more than four brake shoes, an additional arm on each member of the spreader is necessary for each pair of brake shoes.

It will be noted that by this construction when any two adjacent arms of the spreader are moved apart, the same movement will take place with respect to each pair of adjacent arms.

It will be noted that the free ends 21 of the brake shoes slope to approximately conform to the slope of the ends 16 and 16a so that when the spreaders are moved apart such action will tend to press the brake shoe against the drum. To accomplish the opening of said spreading members I have provided an eccentric roller 19 which is pivotally attached by shaft 20 to the base 10, and positioned between two arms of the spreader extending in the same general direction. In this instance the arms shown are 15 and 15a. This eccentric roller is moved by a lever 23 shown in Fig. 3. By moving this eccentric roller it will be noted that the four arms are all simultaneously pushed against the periphery of the drum. Springs 22 are adapted to hold the brake shoes in an inactive position when the eccentric roller is positioned to permit such inactive brakes.

Fig. 5 shows a modified form of one of the members of a spreader. The ring 14 is the same as in the other form, but the arms 26 and 26a are shaped more slender than the preferred form.

Having described my invention I claim:

In a motor car brake having a drum rotatable with the wheel, and a nonrotatable fixed base adjacent to the drum, of four brake shoes having surfaces thereon approximately the same curvature as the inside periphery of the drum, said shoes being arranged in pairs, the shoes of each pair being pivotally attached to the base at adjacent ends, the ends of the shoes opposite to the pivoted ends being free and spaced from the next adjacent pair of shoes, said shoes being positioned with reference to the drum so that the free ends of the shoes can be moved to engage the inside periphery of the drum, and means for moving the shoes in active relation with the drum consisting of two spreader members adapted to cooperate, each spreader being pivotally attached to the base concentric with the drum, arms on said spreader members extending to the space between the free ends of the brake shoes, the surface of the free ends of said shoes and the adjacent spreader arms having cooperating slopes so that by a movement of the arm toward the shoe said shoe will engage the drum, an eccentric roller adapted to separate a pair of the spreader arms pivotally positioned between said spreader arms, and spring means for normally holding the brake shoes in inactive relation with the drum.

SERGIO J. SCHIAVON.